STABILIZED IMPEDANCE CONVERTER

Filed May 31, 1955

INVENTOR.
WILLIAM W. HALL JR.

BY Harry M. Saragovitz

ATTORNEY

United States Patent Office 2,823,357

Patented Feb. 11, 1958

2,823,357

STABILIZED IMPEDANCE CONVERTER

William W. Hall, Jr., La Salle, Ill., assignor to the United States of America as represented by the Secretary of the Army Application May 31, 1955, Serial No. 512,345

5 Claims. (Cl. 333—80)

(Granted under Title 35, U. S. Code (1952), sec. 266)

The invention described herein may be manufactured and used by or for the Government for governmental purposes without the payment of any royalty thereon.

This invention relates to negative impedance circuits and more particularly to stabilized negative impedance converter circuits.

A negative impedance converter, i. e., a circuit for converting positive impedance into negative impedance, is an active two-terminal pair network which presents at either of its terminal pairs the negative of the impedance connected to the other terminal pair. The ideal negative impedance converter is a network or device, with two pairs of terminals, that has an impedance transformation ratio of $-k:1$, $k$ being a quantity that is a numeric at a prescribed frequency and approximately a numeric over a finite frequency range which includes the prescribed frequency. Thus a negative impedance converter may be considered to have voltage-current relationships for its terminal pairs exactly like those of an ideal transformer except for a polarity reversal in the voltage transformation ratio.

One object of the present invention is to provide a two-terminal pair network in which the impedance looking into one pair of terminals is approximately the negative of the load impedance across the other pair of terminals.

It is another object of the present invention to provide a negative impedance converter having a conversion factor stabilized against substantially all parameter variations of the circuit in which it operates.

In accordance with one embodiment of the present invention there is provided a two-terminal pair network having one terminal pair as input terminals and the other terminal pair terminated by a positive impedance. A circuit is provided for converting the positive impedance to a negative impedance as seen at the input terminals. The converting circuit includes a junction type transistor having an emitter electrode, a base electrode and a collector electrode, and means in coupling relationship with the collector electrode for producing discrete positive and negative feedback paths between the collector electrode and the emitter electrode. The input terminals are in circuit with one of the feedback paths and the positive impedance is in circuit with the other of the feedback paths.

In accordance with another embodiment of the invention there is provided a circuit for converting a positive impedance connected across one terminal pair of a two-terminal pair network to a negative impedance at the other terminal pair which includes a junction type transistor having a collector electrode, an emitter electrode, and a base electrode and discrete means in coupling relationship with the collector electrode for respectively producing a positive and a negative feedback path between the collector and emitter electrodes. The positive impedance and the other terminal pair are connected in series arrangement in the positive feedback path.

For a better understanding of the invention, together with other and further objects thereof, reference is had to the following description taken in connection with the accompanying drawing in which.

Figure 1:
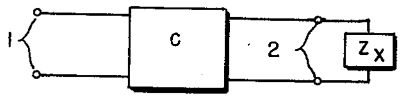
Figures 1 and 2 illustrate a basic negative impedance converter.

Figure 1 presents an ideal negative impedance converter C which is capable of bilateral transmission and is shown as having two pairs of terminals. If a positive impedance $Z_X$ is connected across terminals 2, $-kZ_X$ is seen at input terminals 1. It is to be noted that there are two types of negative impedance, the series type and the shunt type. If the impedance is defined as $Z=E/I$, then the negative impedance can be either Z multiplied by $-1$ or Z divided by $-1$. With $Z_X$ connected as shown in Figure 1 the negative impedance seen at input terminals 1 is the series or reverse voltage type $$\frac{-E}{I}$$

and with $Z_X$ connected at terminals 1, the negative impedance seen at input terminals 2 is the shunt or reverse current type $$\frac{E}{-I}$$

Figure 2:
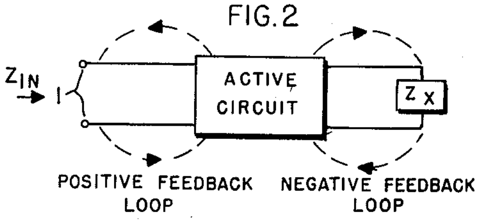

The series type of negative impedance shown in Figure 1 is known as open-circuit stable while the shunt type, with $Z_X$ reversed, is known as short-circuit stable. In such converter circuits it is desirable to utilize an active device having a positive and negative feedback loop with $Z_X$, the impedance to be converted, in the negative feedback loop and the circuit input terminals in the positive loop. With the positive and negative loops shown in Figure 2, $Z_{IN}$ may be determined in accordance with the following well known equation:

$$Z_{IN\,(\text{active})}=Z_0\frac{F(0)}{F(\infty)}=Z_0\frac{1+T(0)}{1+T(\infty)} \qquad (1)$$

where:

$Z_0$ is the passive impedance (active element dead);

$Z_{IN}$ is the active impedance, and $F(0)=1+T(0)$ and $F(\infty)=1+T(\infty)$ are the feedbacks with the input terminals 1 respectively short-circuited and open-circuited. This equation is derived in Network Analysis and Feedback Amplifier Design, by Bode. If vacuum tubes or similar active devices are utilized as the active circuit and $Z_0=Z_X$, then Equation 1 may be expressed as $$Z_{IN\,(\text{active})}=Z_X\frac{1+T(0)}{1+T(\infty)} \qquad (2)$$

where T corresponds to $-\gamma\beta$ in ordinary amplifier design and in absolute value is usually much greater than 1. Hence with $|\gamma\beta|>>1$, and with the requirement that the feedback be independent of the impedance to be converted and $T(0)=T(\infty)$, then it is apparent that $$Z_{IN\,(\text{active})}\doteq -Z_X \qquad (3)$$

It is well known that the procedure is reversible so that an impedance converter as described in Figure 1 may provide bilateral operation.

Figure 3:
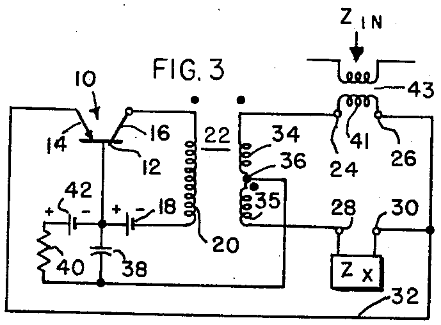
Figure 3 is a schematic diagram of one embodiment of the present invention.

Figure 3 shows a circuit schematic of a practical negative impedance converter embodying one specific aspect of the invention. At 10 there is shown a junction type transistor having a base electrode 12, an emitter electrode 14, and a collector electrode 16. Such transistors are so well known in the art that no further description thereof is believed necessary. A suitable bias source 18 is applied to collector electrode 16 as a negative potential through the primary winding 20 of transformer 22. As shown, the positive terminal of source 18 is connected to base electrode 12. Two sets of terminals 24, 26 and 28, 30 are provided and arranged so that terminals 24 and 26 are the input terminals and the positive impedance $Z_X$ is connected across terminals 28, 30. Terminals 26 and 30 are connected through lead 32 to emitter electrode 14. Connected across the remaining terminals 24 and 28 are a pair of series aiding coil windings 34 and 35, each having the same number of turns, which comprise the secondary winding of transformer 22. Transformer 22 may have a prescribed turns ratio of $n$ with the primary winding 20 having $n$ turns and the secondary windings 34 and 35 being unity. Junction connection 36 of secondary windings 34 and 35 is coupled to base electrode 12 through capacitor 38 and is also connected to base electrode 12 through resistor 40 and a bias source 42 having its negative terminal connected to base electrode 12 as shown. By this arrangement a positive potential is applied to emitter electrode 14 through resistor 40, through winding 34, through secondary winding 41 of transformer 43 and lead 32. Like polarities on both the primary and secondary windings of transformer 22 are indicated by the position of the dots. With such an arrangement the input terminals 24 and 26 are in a positive feedback loop and the positive impedance $Z_X$ is connected in a negative feedback loop. It is to be noted that in this aspect of the invention external feedback loops are utilized.

Figure 4:
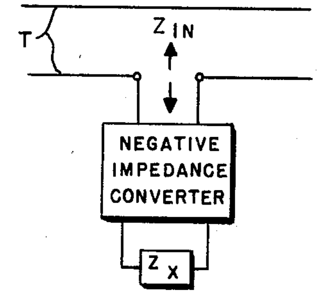
Figure 4 illustrates the practical use of a negative impedance converter in accordance with the present invention.
Figure 5:
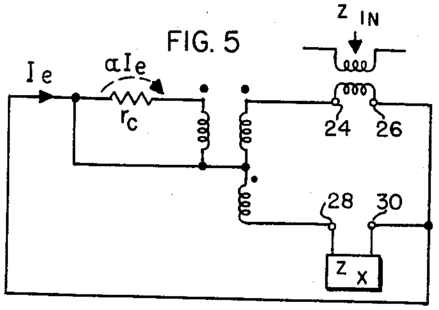
Figures 5, 6 and 7 are equivalent circuits for explaining the operation of the negative impedance converter shown in Figure 3.

Figure 4 illustrates one example of how the circuit shown in Figure 3 may be utilized with a transmission line T. Figure 5 shows the equivalent circuit of Figure 3 with junction transistor 10 being considered an ideal transistor in which $r_e = r_b = 0$ and transformer 22 is considered to be an ideal transformer having a turns ratio equal to $n$ as explained hereinabove.

Figure 6:
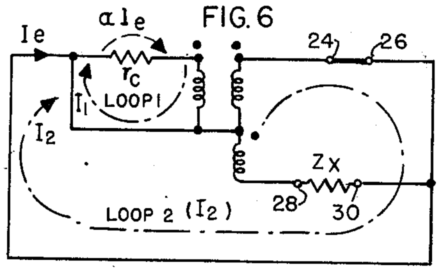

In considering the operation of the circuit of Figure 3, reference will be made to the equivalent circuit shown in Figures 5, 6 and 7. Referring now to the circuit of Figure 5, with the active element 10 dead, we have $$Z_{IN\,(\text{passive})} = Z_0 = \frac{Z_X \frac{r_c}{n^2}}{Z_X + \frac{r_c}{n^2}} = Z_X \text{ if } |Z_X| \ll \frac{r_c}{n^2} \quad (4)$$

Inasmuch as $r_c$ for junction transistors is known to be usually high, for example over 1 megohm, Equation 4 will hold true for all practical purposes. Figure 6 shows the circuit of Figure 5 with the input terminals 24 and 26 short-circuited. For purposes of explanation, let it be assumed that $I_e = 1$ (unity), and with the positive feedback loop thus shorted the current flowing in loop 1 will be $$I_1 = \alpha I_e = \alpha \quad (\alpha = \text{current gain of transistor}) \quad (5)$$

and the feedback remaining will be the positive feedback from loop 2. It can readily be seen from Figure 6 that $I_2 = I_e = nI_1$ and since $I_2$ is the positive feedback current then with the input terminals short-circuited, it follows that $$T_0 = n\alpha \quad (6)$$

Figure 7:
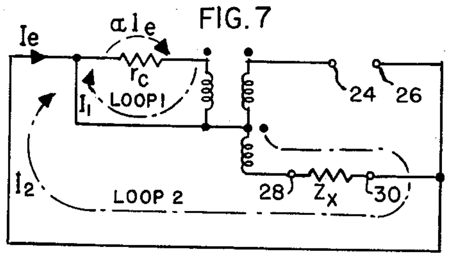

Similarly, it can be shown that with terminals 24 and 26 open (Figure 7)

$$I_2 = -n\alpha \frac{r_c}{r_e + n^2 Z_X} \quad (7)$$

This relationship is readily apparent when it is considered that the current is divided between $r_c$ and $Z_X$ which is reflected through transformer 22 as $n^2 Z_X$. Thus, with the terminals 24 and 26 open-circuited we have $$T(\infty) = n\alpha \frac{r_c}{r_c + n^2 Z_X} \quad (8)$$

Substituting the values of $T_{(0)}$ and $T_{(\infty)}$ of Equations 6 and 7 in Equation 2 and including the value of $Z_0$ from Equation 4 we have $$Z_{IN\,(\text{active})} = \left(\frac{Z_X \frac{r_c}{n^2}}{Z_X + \frac{r_c}{n^2}}\right)\left(\frac{1 - n\alpha}{1 + n\alpha \frac{r_c}{r_c + n^2 Z_X}}\right) \quad (9)$$

However, in view of the assumption set forth in Equation 4 that if $$|Z_X| \ll \frac{r_c}{n^2}$$

then $$\frac{\frac{r_c}{n^2}}{Z_X + \frac{r_c}{n^2}} \doteq 1 \quad (10)$$

and, as a result we have $$Z_{IN\,(\text{active})} = Z_X \frac{1 - n\alpha}{1 + n\alpha} = -kZ_X \quad (11)$$

where $k$ is the conversion factor.

With $\alpha$ for a junction transistor known to be $\geqslant 0.95$ and an "$n$" turn ratio of 10, for example, then $$Z_{IN} = Z_X \frac{1 - 9.5}{1 + 9.5} = -Z_X \frac{8.5}{10.5} \quad (12)$$

It can readily be shown that the conversion factor $k$ when using a junction type transistor is substantially independent of $Z_X$, $r_c$ $\alpha$ or $n$. For example, using typical parameters such as $n = 10$, $r_c = 1$ megohm and $\alpha = 0.95$, it was found that 100% change in $r_c$ will cause a change of less than 10% in the conversion factor $k$.

In a similar manner, it can be shown that if the connections are reversed, viz., $Z_X$ is connected to terminals 24 and 26 of Figure 3 and the input is connected across terminals 28 and 30, the circuit of Figure 3 will provide negative impedance conversion which is stabilized against substantially all parameter variations of the circuit, except of course the turns ratio of the transformer 43 which is assumed to be 1:1.

Figure 8:
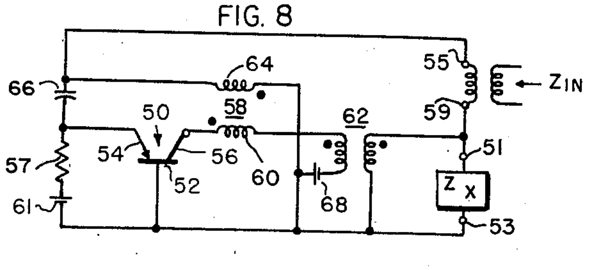
Figure 8 illustrates another embodiment of the present invention.

Figure 8 illustrates a stabilized converter circuit utilizing internal feedback in place of the external feedback shown in Figure 3. Referring now to Figure 8, there is shown at 50 a junction type transistor having a base electrode 52, an emitter electrode 54 and a collector electrode 56. Emitter 54 is biased in the forward direction through resistor 57 which is connected between the positive terminal of source 61 and emitter 54. The negative terminal of source 61 is connected to base electrode 52. Internal feedback between collector electrode 56 and emitter electrode 54 is provided by means of a transformer 58 comprising a primary winding 60 in series connection between collector electrode 56 and the primary of converter transformer 62 and a secondary winding 64 having one end connected to base electrode 52 and the other end coupled to emitter electrode 54 through capacitor 66. Collector electrode 56 is biased in the backward direction by direct-current source 68 having its negative terminal connected to the free end of the primary of converter transformer 62 and its positive terminal connected to base electrode 52. Connected across the terminals 51, 53 of the secondary of transformer 62 is the impedance $Z_X$ to be converted. The input terminals 55, 59 are connected between one terminal 51 of the secondary winding of transformer 62 and the junction connection of coil winding 64 and capacitor 66. The other terminal 53 of the secondary winding of transformer 62 is connected to base electrode 52. Like polarities on the primary and secondary windings of both the feedback transformer 58 and the converter transformer 62 are indicated by the position of the dots. The turns ratio of feedback transformer 58 is designated as $m$ with primary winding 60 having $m$ turns and winding 64 being unity. Converter transformer 62 may have a turns ratio of $n$ with the secondary winding across terminals 51 and 53 being considered unity.

In discussing the operation of the circuit of Figure 8, let it be assumed that the feedback transformer 58 has the turns ratio $m$ and the converter transformer 62 has the turns ratio of $n$. By the matrix method of circuit analysis it can be shown that the current gain of transistor 50 with the internal feedback arrangement as shown in Figure 8 is $$\alpha'=\frac{\alpha}{1+m\alpha} \tag{13}$$

where $\alpha$ is the current gain of the transistor without feedback. Similarly, it can be shown that the collector resistance with the internal feedback as shown in Figure 8 is $$r_c'=r_c(1+m\alpha) \tag{14}$$

Now, with the transistor dead, viz., terminals 55 and 59 short-circuited, the passive impedance may be expressed as $$Z_{IN\,(\text{passive})}=Z_0=\frac{Z_X\frac{r_c'}{n^2}}{Z_X+\frac{r_c'}{n^2}} \tag{15}$$

Since for Figure 8 $F(0)=-n\alpha$ and $F(\infty)=1$, we have, as explained in Equation 1 hereinabove $$Z_{IN\,(\text{active})}=\left(\frac{Z_X\frac{r_c'}{n^2}}{Z_X+\frac{r_c'}{n^2}}\right)\left(\frac{1-n\alpha'}{1}\right) \tag{16}$$

Now, if $$Z_X\ll\frac{r_c'}{n^2}$$

then $$Z_{IN\,(\text{active})}=Z_X\frac{1-n\alpha'}{1}=-kZ_X \tag{17}$$

Since the factor $n$ is a turns ratio, the feedback conversion factor has obviously been stabilized, and if $$n\alpha'=2 \tag{18}$$

then the conversion factor $=-1$ and thus $$Z_{IN}=-Z_X \tag{19}$$

The converter shown in Figure 8 is reversible, that is, $Z_X$ and input terminals 55 and 59 may be reversed in the circuit and it will still operate as a stabilized impedance converter. In this case the passive impedance is again $$Z_{IN\,(\text{passive})}=Z_0=\frac{Z_X\frac{r_c'}{n^2}}{Z_X+\frac{r_c'}{n^2}} \tag{20}$$

Now, under these conditions, $F(0)=1$ and $$F(\infty)=1-\frac{n\alpha'}{1+Z_X\frac{n^2}{r_c'}}$$

we have $$Z_{IN\,(\text{active})}=\left(\frac{Z_X}{1+Z_X\frac{n^2}{r_c'}}\right)\left(\frac{1}{1-\frac{n\alpha'}{1+Z_X\frac{n^2}{r_c'}}}\right) \tag{21}$$

assuming $$Z_X\frac{n^2}{r_c'}\ll 1$$

as in the previous case, then $$Z_{IN\,(\text{active})}=Z_X\frac{1}{1-n\alpha'}=-kZ_X \tag{22}$$

and, if $n\alpha'=2$, then $$Z_{IN\,(\text{active})}=-Z_X \tag{23}$$

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a two-terminal pair network having a positive impedance connected across one pair of terminals, a circuit for converting said positive impedance to a negative impedance at the other pair of terminals comprising, a junction type transistor having a base electrode, a collector electrode and an emitter electrode, a first means in coupling relationship with said collector electrode for producing a negative feedback path between said collector electrode and said emitter electrode, a second means in coupling relationship with said collector electrode for producing a positive feedback path between said collector electrode and said emitter electrode, said other pair of terminals and said positive impedance being in series arrangement and in circuit with said second means.

2. The negative impedance converter in accordance with claim 1 wherein said first coupling means comprises a transformer having its primary winding in circuit with said collector electrode and its secondary winding in circuit with said emitter electrode.

3. The negative impedance converter in accordance with claim 1 wherein said second coupling means comprises a transformer having its primary winding in circuit with said collector electrode and its secondary winding connected across said positive impedance.

4. The negative impedance converter in accordance with claim 1 wherein said second coupling means comprises a transformer having its primary winding in circuit with said collector electrode and its secondary winding connected across said other pair of terminals.

5. In a two-terminal pair network having a positive impedance connected across one pair of terminals, a circuit for converting said positive impedance to a negative impedance at the other pair of terminals comprising a junction type transistor having an emitter electrode, a base electrode and a collector electrode, a discrete negative feedback path and a discrete positive feedback path connected between said collector electrode and said emitter electrode, a first transformer and a second transformer having respective primary windings in series circuit with said collector electrode, the secondary windings of said first transformer being in said negative feedback path and the secondary winding of said second transformer being in said positive feedback path, said positive impedance pair being in parallel arrangement with the secondary winding of said second transformer, and said other pair of terminals being in series connection with said parallel arrangement and coupled to said emitter electrode.

References Cited in the file of this patent

FOREIGN PATENTS 1,063,496 France ................ Dec. 12, 1953